I. Stratton.
Making Wadding.

Nº 41,648.   Patented Feb. 16, 1864.

Witnesses:                    Inventor.

UNITED STATES PATENT OFFICE.

ISAAC STRATTON, OF SWANZEY, NEW HAMPSHIRE.

IMPROVEMENT IN THE MODE OF MANUFACTURING WADDING.

Specification forming part of Letters Patent No. 41,648, dated February 16, 1864.

*To all whom it may concern:*

Be it known that I, ISAAC STRATTON, of the town of Swanzey, in the county of Cheshire and State of New Hampshire, have invented an improvement in machines for manufacturing or sizing cotton or woolen wadding made from ground rags or shoddy; and I do hereby declare the following a full, clear, and exact description thereof, reference being had to the accompanying drawings, and to the letters of reference marked thereon, in which—

Figure 1:
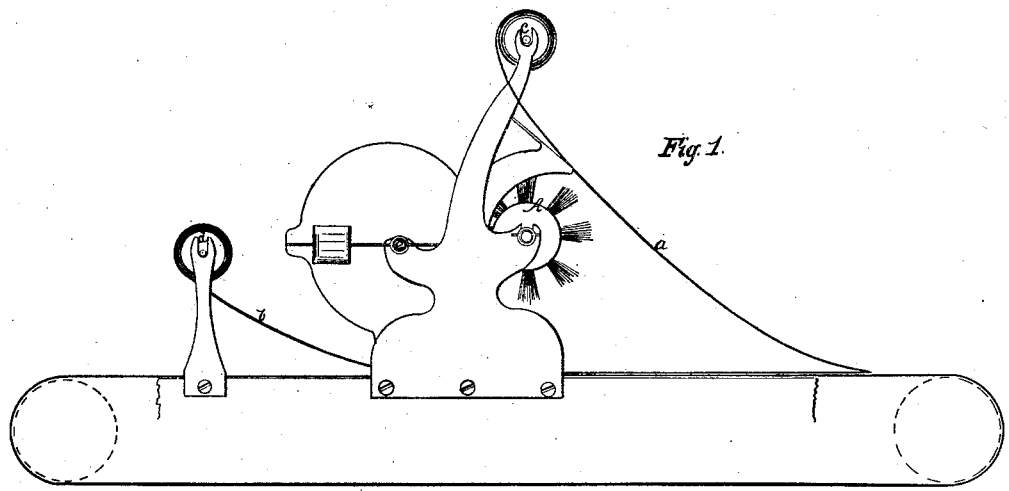
Figure 2:
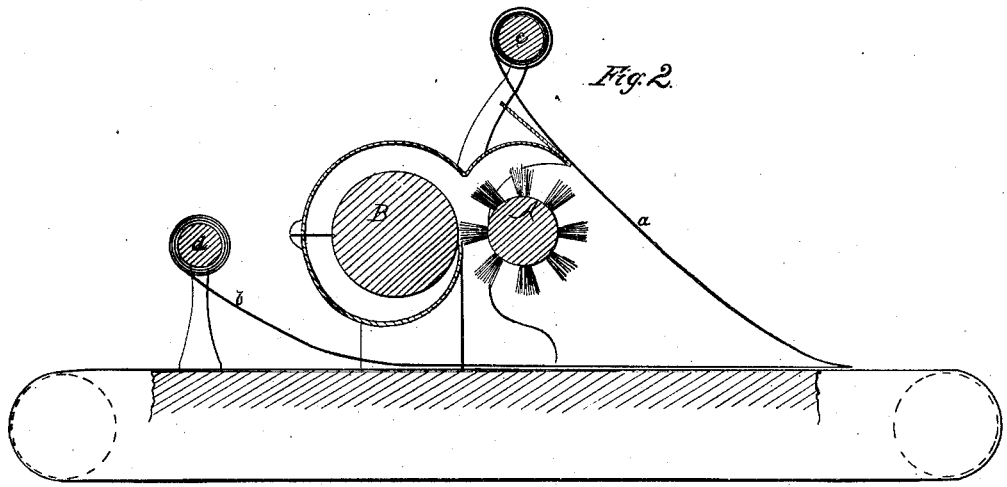

Figure 1 is a side elevation, and Fig. 2 a longitudinal vertical section through the center.

To enable others skilled in the art to make and use my invention, I will proceed to describe the construction and operation of my machine.

I apply a rotary brush, A, on the front side of and in close contact with the periphery of the common sizing-cylinder B. The sizing-cylinder is made to revolve by any ordinary means—say about twenty times per minute—while partly immersed and revolving in the vessel containing the sizing material. The brush is made to revolve at least two thousand times a minute, thereby throwing the sizing-liquid from the surface of the cylinder in a mist or spray upon both laps. They are then, being united together by the sizing, carried off upon an ordinary endless apron traveling underneath the roller and brush, and dried in the ordinary way of drying cotton wadding. I distribute the sizing into the center of the wadding by a peculiar arrangement and joinder of two laps. I place a roller, C, on which the lap *a* is wound, some two feet above the revolving apron, and the lap *a*, as delivered, unrolls in front of the brush and receives on its under side the spray that comes from the brush. I also place a roller, *d*, on which lap *b* is wound, just behind the cylinder and brush, and this lap when delivered passes under the same and receives on its upper side simultaneously with the upper lap the spray which is thrown from the brush. Said laps then unite and pass between a set of rollers in the ordinary way, thus uniting the two with the sizing in the middle of the laps, and the material thus united is delivered from the machine by means of the endless apron.

While I have stated certain velocities for the different parts of my machine, I do not intend to confine myself to these, as it is evident these velocities may be varied as may be found desirable.

I am aware that in machines of this class the sizing has been thrown in the form of a mist upon a heated cylinder, and also directly upon the surface of a single sheet of batting. These I do not claim; but

What I claim is—

The mode of operation herein described of manufacturing a batting or wadding, the same consisting in the throwing the sizing in the form of a mist simultaneously upon the inner surfaces of two independent bats and then uniting these bats under pressure while in the moist state.

ISAAC STRATTON.

Attest:
J. H. PHILLIPS,
S. W. WOOD.